UNITED STATES PATENT OFFICE.

WILHELM HERZBERG AND OSCAR WEBER, OF BERLIN, GERMANY, ASSIGNORS TO THE ACTIEN-GESELLSCHAFT FÜR ANILIN FABRIKATION, OF SAME PLACE.

BLUE DYE.

SPECIFICATION forming part of Letters Patent No. 539,738, dated May 21, 1895.

Application filed February 23, 1895. Serial No. 539,438. (Specimens.) Patented in France October 1, 1894, No. 241,756.

*To all whom it may concern:*

Be it known that we, WILHELM HERZBERG and OSCAR WEBER, of Berlin, in the Kingdom of Prussia, German Empire, have invented new and useful Improvements in the Manufacture of Blue Dye, (for which a patent has been issued in France to our assignees, the Actien-Gesellschaft für Anilin Fabrikation, No. 241,756, dated October 1, 1894;) and we do hereby declare that the following is a full, clear, and exact description of the invention, which will enable others skilled in the art to which it appertains to make and use the same.

In the specification forming part of Letters Patent No. 522,897, dated July 10, 1894, we have described a blue coloring-matter obtained by heating with sulfur and fuming sulfuric acid the condensation-products obtained from ortho-quinone compounds and alkyl-para-phenylendiamin compounds. The constitution of these dye stuffs corresponds to the following typical formula:

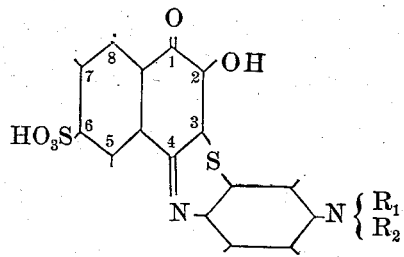

The present invention is based on the observation that dye-stuffs of similar properties but of different chemical constitution are obtained by heating with sulfur and fuming sulfuric acid the condensation products obtained from alpha$_1$-beta$_1$-amidonaphtol or its sulfo acids and the para-nitroso-derivative of an alkylated amin (secondary or tertiary amin.)

The aforesaid condensation products contain according to our researches as radical the bodies the constitution of which may be represented by the following typical formula:

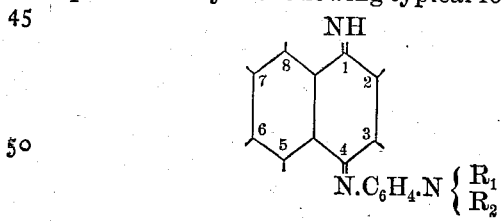

($R_1$ and $R_2$ signifying alkyl-groups; but in as far as secondary amines be used one of these R signifies hydrogen.) The dye-stuffs derived from such condensation products possess the constitution corresponding to the following typical formula:

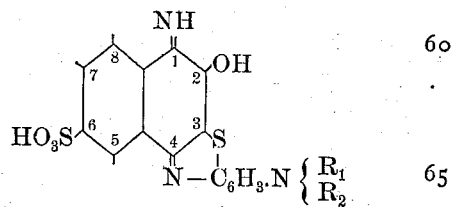

By comparing this formula with that one belonging to the products mentioned in the specification No. 522,892 it may be seen that the new dies contain the quinonimid group while the former one contains the quinon group.

The coloring matters forming part of the present application are also capable of forming lakes with metallic mordants which dye with beautiful fast blue tints and are especially well suited for dyeing and printing wool and cotton, previously mordanted with chromium.

The following example is given to illustrate the manner in which we may practically carry out our invention.

26.1 kilograms of the sodium salt of the alpha$_1$-beta$_1$-amidonaphtol-beta$_3$-monosulfo acid are dissolved in four hundred liters of water and while agitating 18.6 kilograms of the hydrochloric salt of the nitrosodimethylanilin, dissolved in four hundred liters of water, are added. After three or four days the condensation is completed and the condensation product is filtered off, pressed and dried. The product thus obtained forms in dry state a blue-black powder and can be transformed into the blue dye-stuff in the following manner:

Ten kilograms of the same and two kilograms flowers of sulfur are dissolved in one hundred kilograms of fuming sulfuric acid, containing about twenty-three per cent. of anhydrid and heated for five or six hours at a temperature between 40° and 60°. The whole is poured into water and the precipitate is separated by filtration and afterward dissolved in diluted soda solution. The solution obtained is filtered in order to remove the sulfur and the coloring matter is then precipitated by means of common salt. The new product thus obtained forms a blue crystalline powder which is moderately soluble in cold, more readily in hot water with a violet blue color. On addition of caustic soda the color turns more gray violet. The dye dissolves in concentrated sulfuric acid with a green color, and by diluting with water the free color acid is precipitated as a blue powder, which is slightly soluble in alcohol with a violet color and insoluble in ether. The coloring matter may be easily reduced in acid or alkaline solution, but it is very readily reoxidized already in the open air.

In the above described process the sulfur can be substituted by substances capable of forming sulfur sesqui-oxide ($S_2O_3$) when used along with fuming sulfuric acid.

Having now described our invention and in what manner the same is to be performed, what we claim as new, and desire to secure by Letters Patent, is—

1. The process for the production of blue dyes which consists in heating with sulfur and fuming sulfuric acid the condensation products obtained from an alpha$_1$-beta$_1$-amidonaphtol-derivative and a para-nitroso-derivative of an alkylated amin in the manner as hereinbefore described.

2. As a new article of manufacture the blue dye derived from an alpha$_1$-beta$_1$-amidonaphtol-derivative and a para-nitroso-derivative of an alkylated amin, having (in case alpha$_1$-beta$_1$-amidonaphtol-beta$_3$-monosulfo acid and para-nitroso-dimethylanilin be used, the formula:

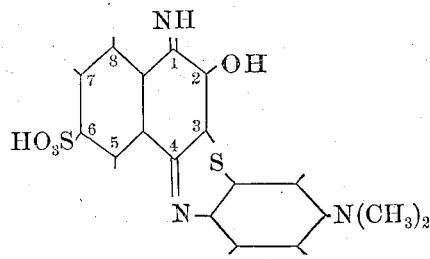

said dye being slightly soluble in alcohol with a violet color insoluble in ether, moderately soluble in cold, more readily in hot water with a violet blue color, which on addition of caustic soda-solution turns more gray-violet; dissolving in concentrated sulfuric acid with a green color, which on adding water changes into blue while the color acid is separated in the shape of a blue powder; yielding by reduction a leuco-compound, readily reoxidizable.

In testimony whereof we hereunto set our hands and affix our seals, in the presence of two witnesses, this 7th day of February, A. D. 1895.

WILHELM HERZBERG. [L. S.]
OSCAR WEBER. [L. S.]

Witnesses:
OSCAR SCHULTHESS,
GUSTAV LUCHS.